March 24, 1953 H. M. KUDO 2,632,379
DOUBLE ELECTRIC GRILL WITH PRESSURE APPLYING MEANS
Filed June 22, 1951
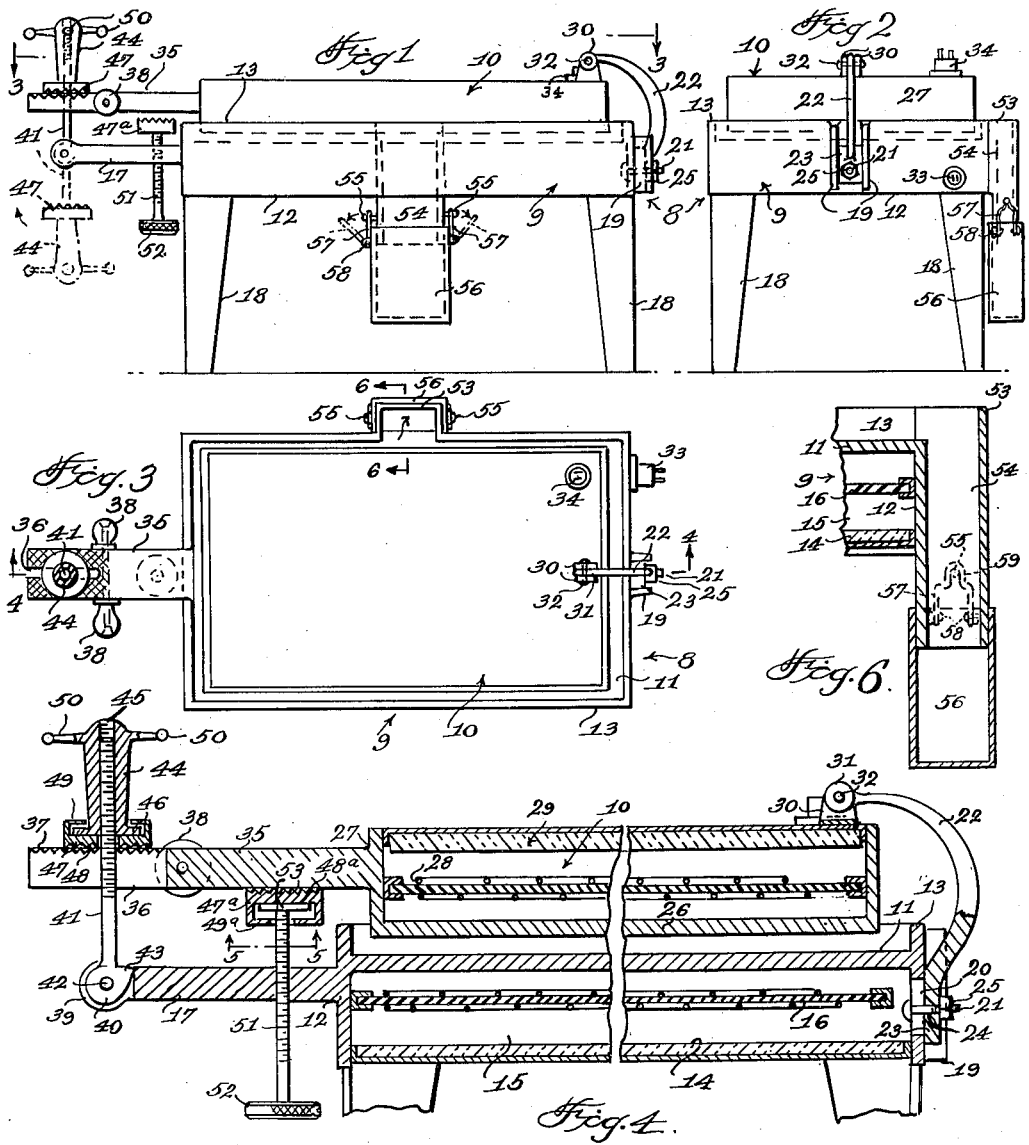
Inventor
HAROLD M. KUDO
By John N. Randolph
Attorney Patented Mar. 24, 1953

2,632,379

UNITED STATES PATENT OFFICE 2,632,379

DOUBLE ELECTRIC GRILL WITH PRESSURE APPLYING MEANS

Harold M. Kudo, Thornton, Ill.

Application June 22, 1951, Serial No. 232,987

1 Claim. (Cl. 99—375)

This invention relates to a double electric cooking grill for simultaneously cooking a food item, such as a steak, on both sides thereof and for applying a desired and uniform pressure to all portions of the food item whereby a rapid and uniform cooking is accomplished.

In restaurants and other eating establishments cooking of food such as steaks must be rapidly accomplished in order to provide the desired prompt service expected by customers. Accordingly, it is a primary object of the present invention to provide an electric grill wherein rapid cooking may be accomplished without any sacrifice in quality and wherein, as for example, in the cooking of a steak both sides of the piece of meat may be simultaneously seared to maintain the juices therein and by maintenance of a proper pressure on the steak at all times uniform cooking of the steak can be rapidly accomplished.

Another object of the invention is to provide a grill wherein a desired uniform pressure may be maintained at all times on the item being cooked and whereby adjustments can be readily made to compensate for shrinkage during cooking and to increase the pressure as desired after the initial stages of the cooking has been accomplished and the food item has become more firm.

Still a further object of the invention is to provide an electric grill wherein the pressure may be minimized to any desired extent in cooking certain soft foods requiring little or no pressure.

Still a further object of the invention is to provide a grill which may be adjusted for cooking food items of different thickness and which will assure the maintenance of a uniform pressure over the entire area of the food item irrespective of its thickness.

Still another object of the invention is to provide an electric grill having a novel means to facilitate the cleaning of the grill to remove oil, grease, carbon and small food fragments therefrom and which will prevent any of such items falling from the grill onto a table or other supporting surface.

Various other objects and advantages of the invention will hereinafter become more fully apparent from the following description of the drawing, illustrating a presently preferred embodiment thereof, and wherein:

Figure 1 is a side elevational view of the electric grill;

Figure 2 is an end elevational view thereof looking from right to left of Figure 1;

Figure 3 is a top plan view thereof partly in section, taken substantially along a plane as indicated by the line 3—3 of Figure 1;

Figure 4 is an enlarged longitudinal sectional view taken substantially along a plane as indicated by the line 4—4 of Figure 3;

Figure 5 is a fragmentary cross sectional view taken substantially along a plane as indicated by the line 5—5 of Figure 4;

Figure 6 is an enlarged fragmentary vertical sectional view taken substantially along a plane as indicated by the line 6—6 of Figure 3, and Figure 7 is a perspective view of one element of the invention.

Referring more specifically to the drawing, the electric grill in its entirety is designated generally 8 and includes a bottom section, designated generally 9 and a top section, designated generally 10.

The bottom section 9 includes a bottom grill plate 11 and a surrounding flange 12 which is preferably formed integral with the plate 11 and which depends therefrom. The flange 12 is also provided with an upper portion which rises from the upper surface of the grill plate 11 and which forms an upstanding surrounding wall 13. A sub bottom 14 is suitably secured within the bottom portion of the flange 12 and combines with the grill plate 11 and flange 12 to form a chamber 15 in which an electric heating element 16 is suitably supported. As illustrated in Figure 3, each of the sections 9 and 10 is of elongated rectangular shape and one end of the section 9, constituting the front of the grill 8, is provided with an arm 17 which may be formed integral with the flange 12 and which projects outwardly therefrom, as best seen in Figure 4. The bottom section 11 is supported by legs 18 which depend from the corners of the flange 12 and which may be formed integral therewith. The rear portion of the flange 12 intermediate of its side edges and in longitudinal alignment with the extension 17, is provided with spaced vertically disposed ribs 19 formed on the exterior thereof, and said flange 12, between the ribs 19 and beneath the grill plate 11, is provided with an elongated vertically extending slot 20 for receiving the shank of a bolt 21 which extends outwardly therethrough and the head of which is disposed against the inner side of the flange 12. An arcuately curved supporting arm 22 is provided with a straight substantially flat end 23 which fits slidably and nonrotatably between the ribs 19 and which is provided with an opening 24 through which the shank of the bolt 21 extends. A nut 25 threadedly engages the outer end of the bolt 21 and is adapted to be tightened for clamping the arm portion 23 against the flange 12. It will be readily apparent that by loosening the nut 25 the arm 22 may be vertically adjusted within the limits provided by the slot 20 and clamped in different vertically adjusted positions, for a purpose which will hereinafter become apparent.

The top grill section 10 is likewise an elongated rectangular structure but smaller than the bottom section 9 to fit loosely within the wall 13, as best illustrated in Figure 3, and includes a top grill plate 26 constituting the bottom wall of the upper grill section 10 and which is provided with an integral upstanding flange 27 rising from both longitudinal and transverse edges of the plate 26. An electrical heating element 28 is suitably supported within the surrounding flange 27 above and adjacent the grill plate 26 and the open top of the upper section 10, defined by the upper edge of the flange 27, is closed by a closure 29 which, like the closure 14, is preferably formed of electrical insulating and heat insulating material. The closure 29 is likewise suitably secured to the flange 27 and is provided with a pair of spaced upstanding apertured ears 30 which are located intermediate of the side edges of the section 10 and adjacent the end thereof disposed adjacent the arm 22. The arm 22, opposite to its end 23, has an aperture end 31 which overlies a portion of the bottom grill plate 11 and which is disposed between the apertured ears 30 and connected thereto by a pivot pin 32 which loosely engages the opening of said end 31 for swingably supporting the upper grill section 10 on the arm 22.

The bottom grill section 9 is provided with an electric plug 33 which is electrically connected to the heating element 16 and the top grill section 10 is provided with an electric plug 34 which is connected to the heating element 28. The plugs 33 and 34 are each adapted to be detachably connected to an electric socket of an electric extension cord, not shown, for energizing the heating elements 16 and 28.

The top section 10 is provided with an arm 35 which projects forwardly therefrom and which is preferably formed integral with the flange 27 at the end thereof disposed remote to the ears 30, said arm 35 being disposed intermediate of the side edges of the section 10 and having an elongated slot 36 extending longitudinally thereof and opening outwardly of its forward end. The upper surface of the arm 35, on either side of the slot 36, is roughened, as indicated at 37. A pair of knobs 38 is secured to and project from the sides of the arm 35, inwardly of the slot 36.

The outer end of the arm 17 is bifurcated to provide spaced vertically disposed furcations 39 for loosely receiving therebetween the slotted apertured end 40 of a threaded bolt 41. A pivot pin 42 extends loosely through the aperture of the bolt end 40 and through the furcations 39 for mounting the bolt 41 from vertical swinging movement on the arm 17. The bolt end 40 is preferably provided with an enlargement 43 forming a stop to engage a portion of the arm 17 to prevent the bolt 41 from being swung upwardly beyond an upright position in a direction inwardly of the sections 9 and 10. An elongated handle 44 has a threaded bore 45 extending longitudinally therethrough in which the opposite end of the bolt 41 is threadedly engaged. Said handle 44 is provided with an annular flange 46 at its inner end which supports a head 47 which is swivelly mounted on the flange 46 loosely around the bolt 41 and which head is provided with a roughened outer surface 48 and a plurality of tongues 49 which project from its inner side and are bent to overlie the flange 46. The handle 44 is provided with a plurality of spokes 50 which project radially therefrom adjacent its opposite, outer end and which form finger-holds for turning the handle.

A bolt 51 is threaded vertically through the arm 17, adjacent the inner end of said arm. Bolt 51 is provided with a knurled thumb knob 52 at its lower end and has a disk 53 at its upper end upon which is swivelly supported a head 47a, corresponding to the head 47, including a roughened outer surface 48a and tongues 49a.

As best seen in Figures 3 and 6, the wall 13 is provided with an outwardly offset portion 53 on one side of the grill 8 and a tube 54 of rectangular cross section extends downwardly from the wall portion 53 and flange 12 and may be formed integral with said parts or suitably secured thereto. The tube 54 extends below the bottom edge of the flange 12 and is provided with knobs 55 which project outwardly from opposite sides thereof. A receptacle 56 of rectangular cross section and having an open top slidably fits over the lower end of the tube 54 and carries a pair of bails 57 which are hinged at 58 to the outer sides of two oppositely disposed walls of the receptacle 56 and which have restricted upper portions 59 engaging over the knobs 55 for supporting the receptacle 56 with its upper end overlapping the open lower end of the tube 54. The receptacle 56 can be displaced upwardly for swingably disconnecting the bails 57 from the knobs 55 or for attaching said bails thereto.

The grill 8 is adapted for cooking various foods and is particularly well adapted for cooking steaks rapidly and uniformly. For cooking a steak, the nut 25 is loosened so that the arm 22 can be vertically adjusted and the nut 25 then tightened to support the rear end of the upper grill plate 26 above the bottom grill plate 11 to accommodate steaks of a particular thickness. The screw 51 is then backed off out of engagement with the arm 35. After the top section 10 is swung downwardly to a horizontal position, the handle 44 is backed off so that the bolt 41 can be swung upwardly to engage in the slot 36, after which the handle 44 is turned to advance the head 47 into engagement with the roughened arm portion 37 and the handle 44 is then tightened to obtain the desired pressure. With the heating elements 16 and 28 energized, both sides of the steak, not shown, will be cooked simultaneously and initially seared to retain the juices therein. A steak is relatively tender when raw and as it is cooked becomes firmer and as the rapidity with which the cooking operation will be accomplished depends upon the pressure applied to the steak, after the steak has been initially seared and has become more firm, the handle 44 may be further tightened to apply a desired pressure to the steak to insure a rapid uniform cooking thereof without, however, initially applying sufficient force to the steak while raw to cause it to be flattened. For cooking various other meats and other foods containing relatively large percentage of fats, as the food item is cooked and the fat melts, the pressure exerted by the top section 10 is reduced and which will be indicated by loosening of the handle 44, so that said handle may be tightened on the bolt 41 during the cooking operation to maintain a desired pressure at all times. For certain other food items such as meat and fish patties, a minimum of pressure is desirable to prevent undue flattening of the foods, as frequently the weight of the top section 10 will provide too great a pressure, and for cooking such items the screw 51 is advanced upwardly so that its head 47a engages under the arm 35 to support the top section 10 in combination with the arm 22 to thus maintain only a slight pressure on the item being cooked.

After cooking any food item, the handle 44 is backed off sufficiently so that the bolt 41 may be swung outwardly and downwardly and thereby disengaged from the notch 36. The knobs 38 are then grasped to swing the upper grill section 10 upwardly in a clockwise direction as seen in Figure 4 for exposing the bottom plate so that the cooked food may be removed therefrom. Frequently, it is necessary to separate the food items from the grill plates 11 and 26 with a suitable utensil such as a spatula. When the grill section 10 is swung upwardly, the rear edge of the grill plate 26 will be supported by the arm 22 over the grill plate 11 so that grease will drain therefrom on the grill plate 11 and food particles and carbon may be scraped therefrom onto the grill plate 11. The grease, food particles and carbon, not shown, are then scraped with a spatula or other utensil into the wall portion 53 so that said elements can fall by gravity through the tube 54 into the receptacle 56 which can be removed and emptied when filled.

Various modifications and changes are contemplated and may obviously be resorted to, without departing from the spirit or scope of the invention as hereinafter defined by the appended claim.

I claim as my invention:

In an electric grill, a bottom grill section and a top grill section, each of said sections including a grill plate and a heating element disposed adjacent thereto for heating the grill plate, said grill plates being adjacently disposed, the grill plate of the bottom section being larger than the grill plate of the top section, said bottom section having an upstanding wall surrounding the bottom grill plate and spaced outwardly from the sides and ends of the top grill section, said wall including an outwardly offset portion having a depending downwardly opening tube forming a drainage outlet for grease and other foreign matter, a receptacle fitting over the discharge end of said tube, means detachably mounting the receptacle on said tube, an arm adjustably secured rigidly to the rear end of the bottom grill section having an end disposed directly above a portion of the bottom grill plate, said arm end being connected to a rear end of the top grill section for supporting the top grill section swingably above the bottom grill section and positioned relatively thereto whereby the top grill section is disposed to drain onto the bottom grill plate in either a closed or a substantially upright open position, and means detachably and adjustably connecting the opposite, free ends of the grill sections for maintaining the top grill section in a closed position above and substantially parallel to the bottom grill section and with the grill plates of the grill sections in spaced apart substantially parallel relationship.

HAROLD M. KUDO.

REFERENCES CITED

The following references are of record in the file of this patent:

UNITED STATES PATENTS

| Number | Name | Date |
|---|---|---|
| 721,455 | Mackenzie | Feb. 24, 1903 |
| 1,738,972 | Strader | Dec. 10, 1929 |
| 1,795,710 | Clark | Mar. 10, 1931 |
| 1,839,112 | Mills | Dec. 29, 1931 |
| 1,848,729 | Kuhn et al. | Mar. 8, 1932 |
| 1,929,166 | Freemon | Oct. 3, 1933 |
| 1,988,087 | Peron | Jan. 15, 1935 |
| 2,012,546 | Reinhardt | Aug. 27, 1935 |

FOREIGN PATENTS

| Number | Country | Date |
|---|---|---|
| 69,895 | Austria | Sept. 10, 1915 |